United States Patent [19]
Miller

[11] Patent Number: 5,721,886
[45] Date of Patent: Feb. 24, 1998

[54] SYNCHRONIZER CIRCUIT WHICH CONTROLS SWITCHING OF CLOCKS BASED UPON SYNCHRONICITY, ASYNCHRONICITY, OR CHANGE IN FREQUENCY

[75] Inventor: Robert J. Miller, Columbia, S.C.

[73] Assignee: NCR Corporation, Dayton, Ohio

[21] Appl. No.: 565,519

[22] Filed: Nov. 30, 1995

[51] Int. Cl.$^6$ ........................................... G06F 1/12
[52] U.S. Cl. .................... 395/551; 395/309; 395/559
[58] Field of Search ...................... 395/551, 559, 395/306, 308, 309, 311

[56] References Cited

U.S. PATENT DOCUMENTS

| | | | |
|---|---|---|---|
| 4,290,133 | 9/1981 | Stewart et al. | 370/85 |
| 4,663,546 | 5/1987 | Eitrheim et al. | 307/527 |
| 4,820,939 | 4/1989 | Sowell et al. | 307/269 |
| 4,821,295 | 4/1989 | Sanner | 375/110 |
| 5,099,140 | 3/1992 | Mudgett | 307/269 |
| 5,155,380 | 10/1992 | Hwang et al. | 307/269 |
| 5,155,393 | 10/1992 | Gongwer et al. | 307/480 |
| 5,274,628 | 12/1993 | Thaller et al. | 370/47 |
| 5,274,678 | 12/1993 | Ferolito et al. | 375/108 |
| 5,294,842 | 3/1994 | Iknaian et al. | 307/269 |
| 5,331,669 | 7/1994 | Wang et al. | 375/118 |
| 5,357,146 | 10/1994 | Heimann | 307/269 |

Primary Examiner—Dennis M. Butler
Attorney, Agent, or Firm—Paul W. Martin

[57] ABSTRACT

A synchronizer circuit which bypasses synchronous clock signals or maintains synchronicity of synchronous clock signals without degrading system performance. The synchronizer circuit includes a synchronizer having first and second clock signal inputs. A switching circuit couples to the first clock signal and to the output of the synchronizer. The synchronizer circuit is preferably programmable, and includes a control circuit which determines whether the first and second frequencies are synchronous or asynchronous, which causes the switching circuit to select the synchronizer output when the first and second frequencies are asynchronous, and which causes the switching circuit to select the first clock signal when the first and second frequencies are synchronous. The switching circuit may also couple to a first stage output of the synchronizer, and the control circuit may cause the switching circuit to select the first stage output when the first and second frequencies are synchronous and either of the first and second frequencies is a multiple of the other. The switching circuit may also include logic elements for decoupling the first and second clock signals from a multi-frequency device when the first and second frequencies are changing.

16 Claims, 3 Drawing Sheets

SYNCHRONIZER CIRCUIT WHICH CONTROLS SWITCHING OF CLOCKS BASED UPON SYNCHRONICITY, ASYNCHRONICITY, OR CHANGE IN FREQUENCY

BACKGROUND OF THE INVENTION

The present invention relates to computer systems, and more specifically to a synchronizer circuit for a computer system having components that require multiple operating frequencies.

Some computer systems today have a plurality of buses that operate at different frequencies. These frequencies may be synchronous or asynchronous. For example, some of the more energy-efficient computers idle down to a lower operating frequency. Also, some computers employ clock-doubled or clock-tripled processors that operate at two or three times the frequency on one of the buses in the computers.

Known computers may employ a two-stage synchronizer to synchronize asynchronous clock frequencies. However, the two-stage synchronizers in use degrade system performance when the clock signal inputs have synchronous frequencies.

Therefore, it would be desirable to provide a synchronizer circuit for synchronizing asynchronous clock signals that can also bypass synchronous clock signals, or maintain synchronicity of synchronous clock signals without degrading system performance. It would also be desirable for the synchronizer circuit to be programmable, so that it could be adapted to various situations requiring a synchronizer circuit.

SUMMARY OF THE INVENTION

In accordance with the teachings of the present invention, a synchronizer circuit is provided. The synchronizer circuit includes a synchronizer having first and second clock signal inputs. A switching circuit couples to the first clock signal and to the output of the synchronizer. The synchronizer circuit is preferably programmable, and includes a control circuit which determines whether the first and second frequencies are synchronous or asynchronous, which causes the switching circuit to select the synchronizer output when the first and second frequencies are asynchronous, and which causes the switching circuit to select the first clock signal when the first and second frequencies are synchronous.

The switching circuit may also couple to a first stage output of the synchronizer, and the control circuit may cause the switching circuit to select the first stage output when the first and second frequencies are synchronous and either of the first and second frequencies is a multiple of the other.

The switching circuit may also include logic elements for decoupling the first and second clock signals from a multi-frequency device when the first and second frequencies are changing.

It is accordingly an object of the present invention to provide a synchronizer circuit.

It is another object of the present invention to provide a synchronizer circuit which bypasses synchronized signals, or maintains synchronization of synchronized signals without a degradation of performance.

It is another object of the present invention to provide a synchronizer circuit which detects frequency changes and decouples first and second clock signals from a multi-frequency device.

It is another object of the present invention to provide a synchronizer circuit which is programmable.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
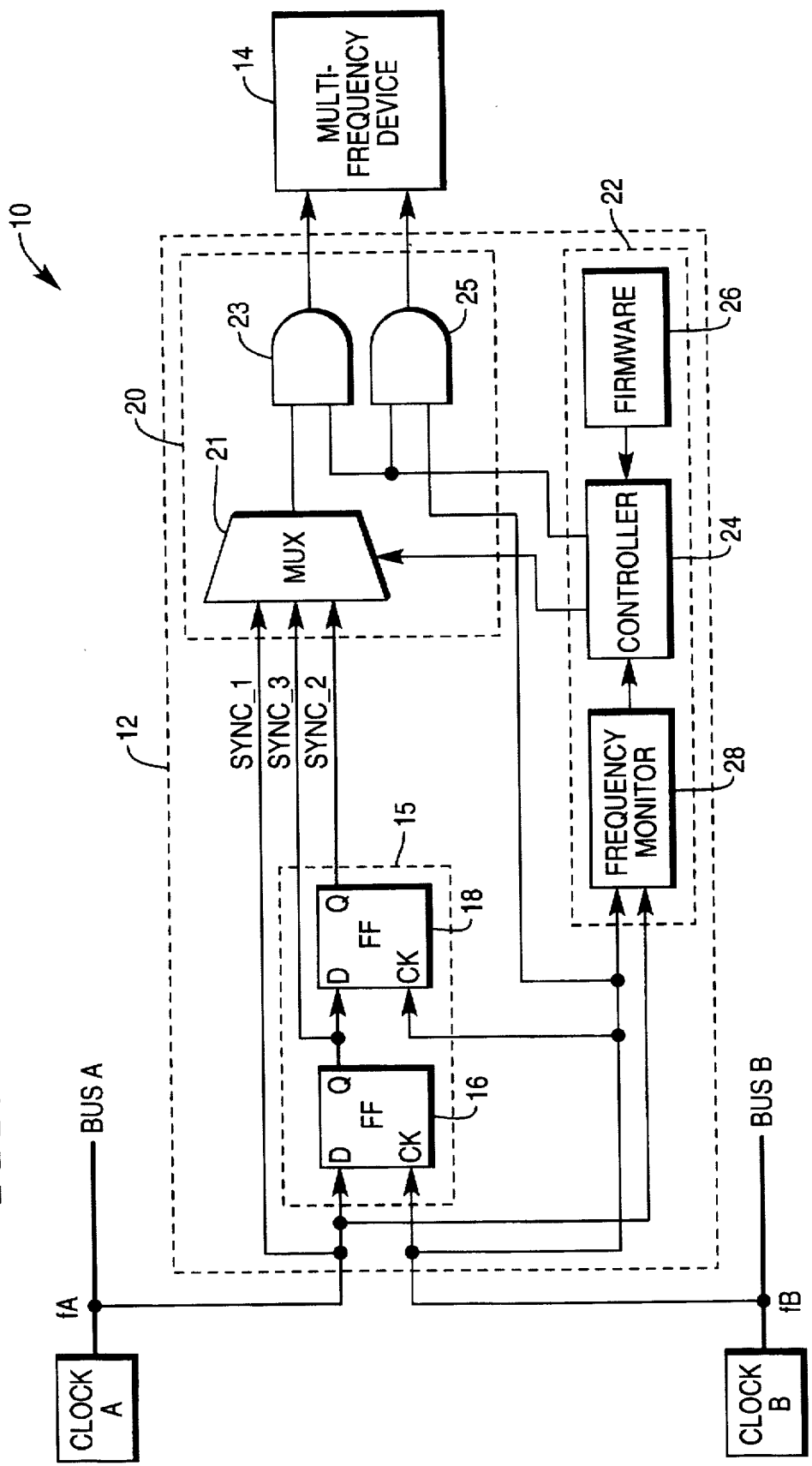
FIG. 1 is a block diagram of the system of the present invention including the synchronizer circuit.

Referring now to FIG. 1, system 10 includes clocks A and B, buses A and B, synchronizer circuit 12, and multi-frequency device 14.

Clocks A and B produce signals having different frequencies for their respective buses A and B. These frequencies may be synchronous or asynchronous. When these frequencies are synchronous, one of the frequencies may be a multiple of the other frequency. In energy-efficient and other computers, these frequencies may change.

Multi-frequency device 14 is any circuit element within system 10 that requires more than one operating frequency and which requires that the operating frequencies by synchronized. Multi-frequency device 14 may include individual components which use the two frequencies.

Synchronizer circuit 12 synchronizes asynchronous signals from clocks A and B, and it optionally ensures that synchronous clock signals from clocks A and B stay synchronized. Since synchronizer circuit 12 is programmable, it can mask clock signals A and B from multi-frequency device 14 when the frequencies from clocks A and B are dynamic.

Synchronizer circuit 12 includes a two-stage synchronizer 15 and includes flip-flops 16 and 18, switching circuit 20, and control circuit 22.

Flip-flops 16 and 18 are preferably D-type flip-flops, although other types of flip-flops may also be adapted for use in synchronizer circuit 12. Flip-flops 16 and 18 have inputs D and CK and outputs Q. The signal from clock A couples to input D of flip-flop 16 and the signal from clock B couples to inputs CK of flip-flop 16 and 18. Output Q from flip-flop 16 couples to input D of flip-flop 18.

Switching circuit 20 preferably includes multiplexor 21 and AND gates 23 and 25, although other combinations of logic elements are also suitable.

In a first embodiment, switching circuit 20 has two inputs (SYNC_1 and SYNC_2) and an output. The signal from clock A couples to one input and output Q of flip-flop 18 couples to the other input. In this embodiment, synchronizer circuit 12 operates to synchronize asynchronous signals from clocks A and B.

In a second embodiment, switching circuit 20 has an additional input (SYNC_3) which couples to output Q of flip-flop 16. In this embodiment, synchronizer circuit 12 operates to maintain synchronization between synchronous signals from clocks A and B.

Control circuit 22 preferably includes controller 24, firmware 26, and frequency monitor 28.

Frequency monitor 28 detects when frequencies fA and fB are asynchronous and when one or both are changing. Frequency monitor 28 then provides signals to controller 24 indicating the presence of such conditions.

Frequencies fA and fB may change in energy efficient computers that lower their operating frequencies under predetermined conditions to lower their energy consumption. Frequencies fA and fB may also change in computers that adjust their frequencies to avoid failure or to increase performance. For example, computers may lower their operating frequencies at higher than normal operating temperatures and increase their operating frequencies in the presence of refrigeration or other cooling.

Controller 24 controls switching circuit 20 in accordance with instructions within firmware 26. Controller 24 monitors frequency monitor 28 for a signal indicating that one or both of frequencies fA and fB are changing, and for a signal indicating that frequencies fA and fB are asynchronous. Controller 24 is preferably a microcontroller, but other processing agents or circuits are also envisioned by the present invention.

Under normal operation, controller 24 enables AND gates 23 and 25 by a control signal. When either or both of frequencies fA and fB are changing, controller 24 disables AND gates 23 and 25 to prevent the signals from clocks A and B from reaching device 14 in both embodiments. Controller 24 removes signals from clocks A and B from device 14 to prevent device 14 from becoming metastable. After frequencies fA and fB stabilize, controller 24 re-enables AND gates 23 and 25.

In the first embodiment, controller 24 selects the SYNC_1 input for synchronous signals and the SYNC_2 input for asynchronous signals.

In the second embodiment, controller 24 selects the SYNC_2 input for asynchronous signals and either the SYNC_1 input or the SYNC_3 input for synchronous signals. The SYNC_3 input is particularly useful when the frequency from clock A is a multiple of the frequency from clock B (e.g., clock A produces 99 MHz and clock B produces 33 MHz).

Device 14 has two inputs which use different frequency signals from clocks A and B through switching circuit 20. Here, the signal from clock A is being synchronized to the signal from clock B.

Figure 2:
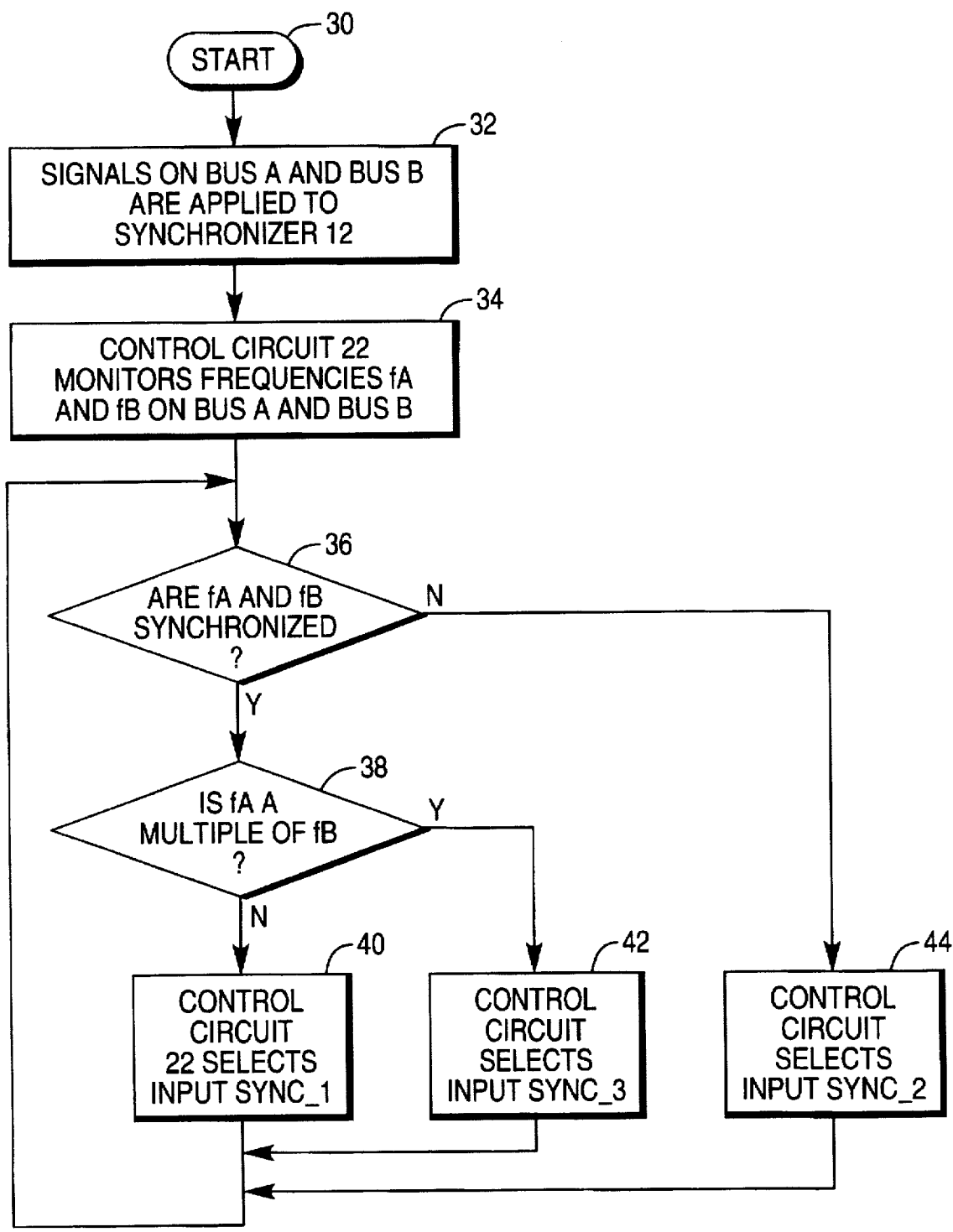
FIG. 2 is a flow diagram illustrating the operation of the synchronizer circuit.

Turning now to FIG. 2, the operation of control circuit 22 is illustrated in more detail, beginning with START 30.

In step 32, signals from clocks A and B are applied to synchronizer circuit 12.

In step 34, control circuit 22 monitors frequencies fA and fB from clocks A and B.

In step 36, control circuit 22 determines whether frequencies fA and fB are synchronized. In the first embodiment, control circuit 22 routes the signal SYNC_1 from clock A directly to device 14 if frequencies fA and fB are synchronized in step 40 and the method returns to step 36.

If frequencies fA and fB are not synchronized, control circuit 22 routes signal SYNC_2 from output Q of flip-flop 18 to device 14 in step 42 and the method returns to step 36.

In the second embodiment, control circuit 22 makes the additional determination whether frequency fA is a multiple of frequency fB in step 38. If it is not, then control circuit routes the signal SYNC_1 from clock A directly to device 14 in step 40 and the method returns to step 36. If it is, then control circuit 22 routes signal SYNC_3 from output Q of flip-flop 16 to device 14 in step 42 and the method returns to step 36.

Figure 3:
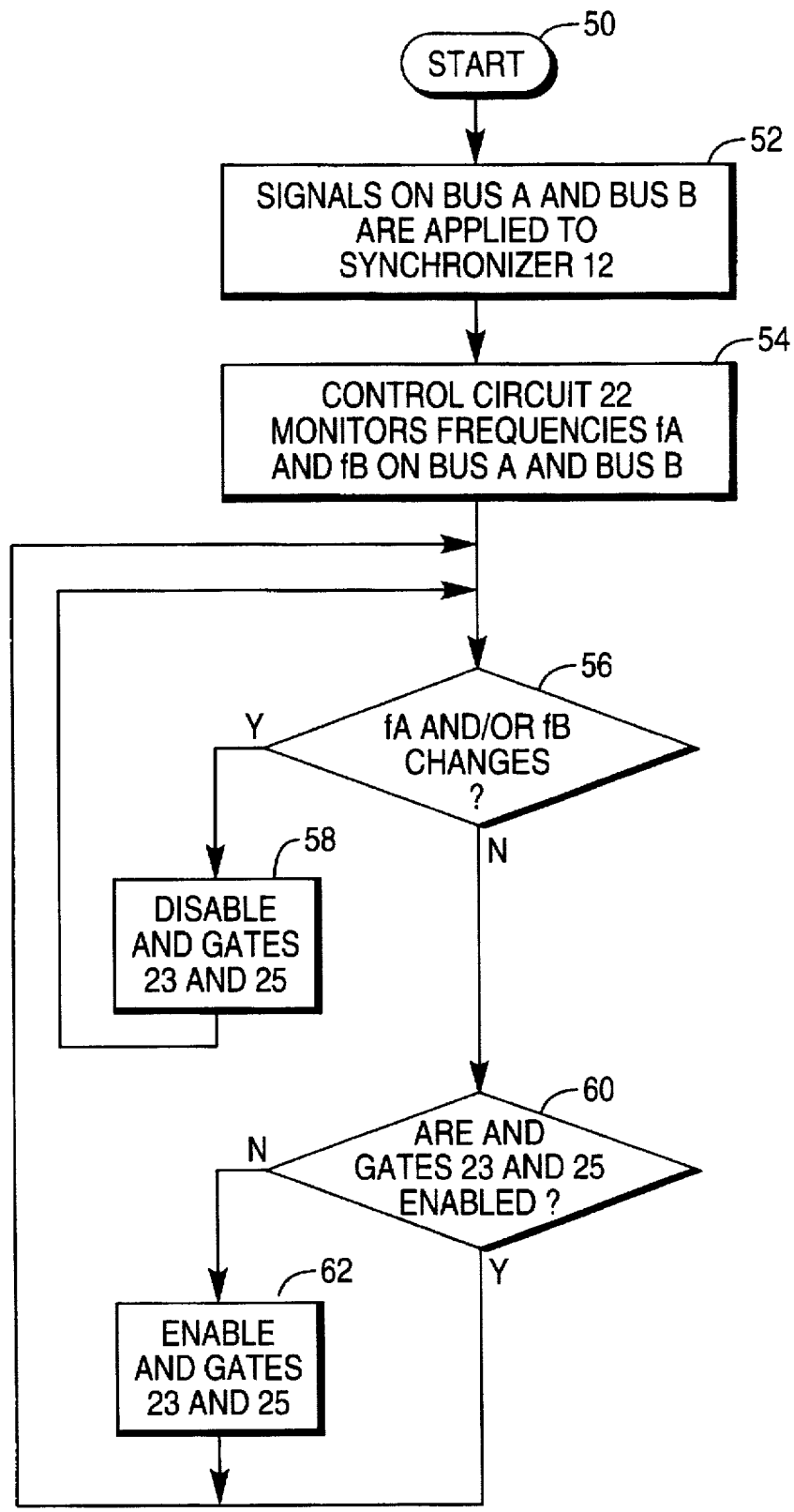
FIG. 3 is a flow diagram further illustrating the operation of the synchronizer circuit.

Turning now to FIG. 3, the operation of control circuit 22 is further illustrated, beginning with START 50.

In step 52, signals from clocks A and B are applied to synchronizer circuit 12.

In step 54, control circuit 22 monitors frequencies fA and fB from clocks A and B.

In step 56, control circuit 22 determines whether one or both of frequencies fA and fB are changing.

If frequencies fA and fB are changing, control circuit 22 disables AND gates 23 and 25 and the method returns to step 56 until frequencies fA and fB are stable.

If frequencies fA and fB are stable, control circuit 22 ensures that AND gates 23 and 25 are enabled in steps 60 and 62, and the method returns to step 56 to monitor frequencies fA and fB.

Although the present invention has been described with particular reference to certain preferred embodiments thereof, variations and modifications of the present invention can be effected within the spirit and scope of the following claims.

What is claimed is:

1. A circuit for synchronizing first and second frequencies of first and second clock signals comprising:

a synchronizer including
a first flip-flop circuit coupled to the first and second clock signals and having an output; and
a second flip-flop circuit having a first input coupled to the output of the first flip-flop, a second input coupled to the second clock signal, and an output;

a switching circuit having first and second inputs and an output, wherein the first input is coupled to the first clock signal and the second input is coupled to the output of the second flip-flop circuit; and control circuit which determines whether the first and second frequencies are synchronous or asynchronous, which causes the switching circuit to select the first input of the switching circuit when the first and second frequencies are asynchronous, and which causes the switching circuit to select the second input of the switching circuit when the first and second frequencies are synchronous.

2. The circuit as recited in claim 1, wherein the control circuit comprises:

a frequency monitor coupled to the first and second clock signals which determines whether the first and second frequencies are synchronous or asynchronous; and a controller coupled to the frequency monitor which controls the switching circuit.

3. The circuit as recited in claim 2, wherein the control circuit further comprises:

firmware containing program instructions used by the controller in controlling the switching circuit.

4. The circuit as recited in claim 1, wherein the control circuit also determines whether at least one of the first and second frequencies is changing.

5. The circuit as recited in claim 4, wherein the switching circuit further comprises:

a third input coupled to the second clock signal; and
a second output representing the second clock signal;
wherein the switching circuit decouples the first and second clock signals and the output of the synchronizer from a multi-frequency device when at least one of the first and second frequencies is changing.

6. The circuit as recited in claim 5, wherein the switching circuit comprises:

a multiplexor having an output;

a first AND gate coupled to the output of the multiplexor and to the control circuit for decoupling the first clock signal from the multi-frequency device in the absence of an enable signal from the control circuit; and a second AND gate coupled to the second clock signal and to the control circuit for decoupling the second clock signal from the multi-frequency in the absence of the enable signal from the control circuit.

7. The circuit as recited in claim 1, wherein the switching circuit comprises a multiplexor.

8. A circuit for synchronizing first and second frequencies of first and second clock signals comprising:

a two-stage synchronizer including a first stage having first and second inputs coupled to the first and second clock signals and an output, and having a second stage having a first input coupled to the output of the first stage and a second input coupled to the second clock signal and an output;

a switching circuit having first, second, and third inputs and an output, wherein the first input is coupled to the first clock signal and the second input is coupled to the output of the second stage and the third input is coupled to the output of the first stage; and control circuit which determines whether the first and second frequencies are synchronous or asynchronous, and which causes the switching circuit to select the second input of the switching circuit when the first and second frequencies are asynchronous, the third input of the switching circuit when the first and second frequencies are synchronous and either of the first and second frequencies is an integer multiple of the other, and the first input of the switching circuit when the first and second frequencies are synchronous and either of the first and second frequencies is not an integer multiple of the other.

9. The circuit as recited in claim 8, wherein the first stage comprises:

a first flip-flop circuit.

10. The circuit as recited in claim 9, wherein the second stage comprises:

a second flip-flop circuit.

11. The circuit as recited in claim 8, wherein the control circuit comprises:

a frequency monitor coupled to the first and second clock signals which determines whether the first and second frequencies are synchronous or asynchronous; and a controller coupled to the frequency monitor which controls the switching circuit.

12. The circuit as recited in claim 11, wherein the control circuit further comprises:

firmware containing program instructions used by the controller in controlling the switching circuit.

13. The circuit as recited in claim 8, wherein the frequency monitor also determines whether at least one of the first and second frequencies is changing.

14. The circuit as recited in claim 13, wherein the switching circuit further comprises:

a fourth input coupled to the second clock signal; and a second output representing the second clock signal;

wherein the switching circuit decouples the first and second clock signals and the first and second outputs of the first and second stages of the synchronizer from a multi-frequency device when at least one of the first and second frequencies is changing.

15. The circuit as recited in claim 14, wherein the switching circuit comprises:

a multiplexor having an output;

a first AND gate coupled to the output of the multiplexor and to the control circuit for decoupling the first clock signal from the multi-frequency device in the absence of an enable signal from the control circuit; and a second AND gate coupled to the second clock signal and to the control circuit for decoupling the second clock signal from the multi-frequency in the absence of the enable signal from the control circuit.

16. The circuit as recited in claim 8, wherein the switching circuit comprises a multiplexor.

* * * * *